(12) United States Patent
Cole

(10) Patent No.: US 6,614,879 B1
(45) Date of Patent: Sep. 2, 2003

(54) METHOD AND APPARATUS FOR INTRA-BUNDLE SIGNALING

(75) Inventor: Terry L. Cole, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/363,441

(22) Filed: Jul. 29, 1999

(51) Int. Cl.⁷ .......................... H04M 1/24; H04M 3/08; H04M 3/22

(52) U.S. Cl. ........................ 379/1.01; 379/1.03; 379/3; 379/27.02; 379/27.03

(58) Field of Search ............................ 379/1.01, 1.03, 379/3, 416–417; 455/67.3, 67.4, 67.7; 370/201; 375/254, 285, 296

(56) References Cited

U.S. PATENT DOCUMENTS 6,055,297 A * 4/2000 Terry

FOREIGN PATENT DOCUMENTS

WO    WO 98/59426    12/1998

OTHER PUBLICATIONS

International Search Report dated Jun. 29, 2000 (PCT/US00/03063; TT3445–PCT).

* cited by examiner

Primary Examiner—Duc Nguyen
(74) Attorney, Agent, or Firm—Williams, Morgan & Amerson, P.C.

(57) ABSTRACT

A communications system includes first and second subscriber lines, a first device, and a second device. The first device has a first negotiation unit coupled to the first subscriber line. The second device has a second negotiation unit coupled to the second subscriber line. The first negotiation unit is adapted to send a first negotiation signal on the first subscriber line. The first negotiation signal induces through cross-talk a second negotiation signal on the second subscriber line. The second negotiation unit is adapted to modify an operating parameter of the second device based on the second negotiation signal. A method for negotiating operating parameters in a communications system is provided. A first negotiation signal is transmitted from a first device coupled to a first subscriber line. The first negotiation signal is received in a second device coupled to a second subscriber line independent of the first subscriber line. An operating parameter of the second device is modified based on the first negotiation signal.

29 Claims, 3 Drawing Sheets

METHOD AND APPARATUS FOR INTRA-BUNDLE SIGNALING

BACKGROUND OF THE INVENTION

1. Field of the Invention

This invention relates generally to communications systems, and, more particularly, to a communications device that uses intra-bundle signaling to negotiate with other communication devices.

2. Description of the Related Art

In communications systems, particularly telephony, it is common practice to transmit signals between a subscriber station and a central switching office via a two-wire, bi-directional communication channel. The Plain Old Telephone System (POTS), designed primarily for voice communication, provides an inadequate data transmission rate for many modern applications. To meet the demand for high-speed communications, designers have sought innovative and cost-effective solutions that take advantage of the existing network infrastructure. Several technological advancements that have been proposed in the telecommunications industry make use of the existing network of telephone wires. One of these technologies is the xDSL technology. DSL technology uses the existing network of telephone lines for broadband communications. An ordinary twisted pair equipped with DSL interfaces can transmit videos, television, and high-speed data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface, the most recent revision of which as of the filing date of this specification is incorporated herein by reference in its entirety.

ADSL modems use two competing modulation schemes: discrete multi-tone (DMT) and carrierless amplitude/phase modulation (CAP). DMT is the standard adopted by the American National Standards Institute. The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 kHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

In a typical ADSL system, a central office (CO) modem communicates with a customer premise (CP) modem over a subscriber line. The CP modem is typically installed in a home or office. The training process is conducted point-to-point (i.e., from the central office to the subscriber). The CO and CP modems negotiate based on the conditions of the subscriber line to maximize the capabilities of the communications link therebetween. The ability of the various tones that make up the ADSL spectrum to carry data depends on numerous factors, including distance from the central office and impairments resulting from noise, cross-talk, etc. Generally, higher tones are significantly attenuated on a long loop connection, and thus, are not useful for carrying data. As a result, the lower tones are used to carry the majority of the data. For shorter loop connections, both the lower and the higher tones may be used to increase throughput or decrease the error rate (e.g., by sending less bits per tone).

Recently, the number of disparate data transmission devices using the subscriber line as a communications channel has increased. For example, home network systems have been developed that use the preexisting internal phone wiring of the home as a network communications channel. The frequency bands used in such a home network commonly overlap those used by an ADSL modem. All wiring downstream of the central office is generally seen as a common bus. That is, the internal wiring of the house is essentially directly connected to the central office. Signal sources generated on the subscriber end have the potential to affect line conditions elsewhere, even out of the subscriber facility.

If a user wishes to implement both a home network and ADSL service, it is typically necessary to fine tune either or both of the services to prevent interference therebetween. For example, the tones used by the ADSL system may be changed or the power level of the ADSL modem or network may be raised or lowered to reduce interference. This type of fine-tuning is possible where the interfering systems are connected to the same subscriber and are presumably under the control of the same entity. However, it is possible for a device such as a modem or home network installed at one facility to deleteriously affect the operation of another such device at a different facility. In such a case, there is no common entity having the authority or means for fine-tuning the respective systems.

Typically, multiple subscriber lines (e.g., 50) exit the central office in a bundle. Individual subscriber lines (i.e., twisted pairs) exit the bundle at different points depending on their respective destinations. The signal present on a particular subscriber line may interfere with the signal on another adjacent subscriber line, a phenomenon known as cross-talk. Consider an ADSL modem on one subscriber line establishes a connection with the central office. The modem is on a relatively short loop and could use high or low tones, but, because the lower tones are more robust, the modem concentrates its bandwidth in the lower tones. At some later time, a second ADSL modem on a longer loop attempts to establish a connection. Because the loop is relatively long, the higher tones cannot be effectively used. Assume the two subscriber lines run close to each other in the bundle. The lower tone signals from the first modem increase the noise detected in the lower tones by the second modem. As a result, the second modem may have difficulty negotiating sufficient bandwidth to establish a connection at its rated data rate.

Such an interfering case may also occur between two home networks or a home network and a modem. The communications signal generated by a home network is not confined to the internal wiring of the installation site because the connection to the central office is continuous. Thus, the network signal is present on the subscriber line wiring within the bundle and may cause cross-talk interference with a home network or modem on an adjacent subscriber line.

The present invention is directed to overcoming, or at least reducing the effects of, one or more of the problems set forth above.

SUMMARY OF THE INVENTION

One aspect of the present invention is seen in a communications system including first and second subscriber lines, a first device, and a second device. The first device has a first negotiation unit coupled to the first subscriber line. The second device has a second negotiation unit coupled to the second subscriber line. The first negotiation unit is adapted to send a first negotiation signal on the first subscriber line. The first negotiation signal induces through cross-talk a second negotiation signal on the second subscriber line. The second negotiation unit is adapted to modify an operating parameter of the second device based on the second negotiation signal.

Another aspect of the present invention is seen in a method for negotiating operating parameters in a communications system. A first negotiation signal is transmitted from a first device coupled to a first subscriber line. The first negotiation signal is received in a second device coupled to a second subscriber line independent of the first subscriber line. An operating parameter of the second device is modified based on the first negotiation signal.

BRIEF DESCRIPTION OF THE DRAWINGS

The invention may be understood by reference to the following description taken in conjunction with the accompanying drawings, in which like reference numerals identify like elements, and in which.

Figure 1:
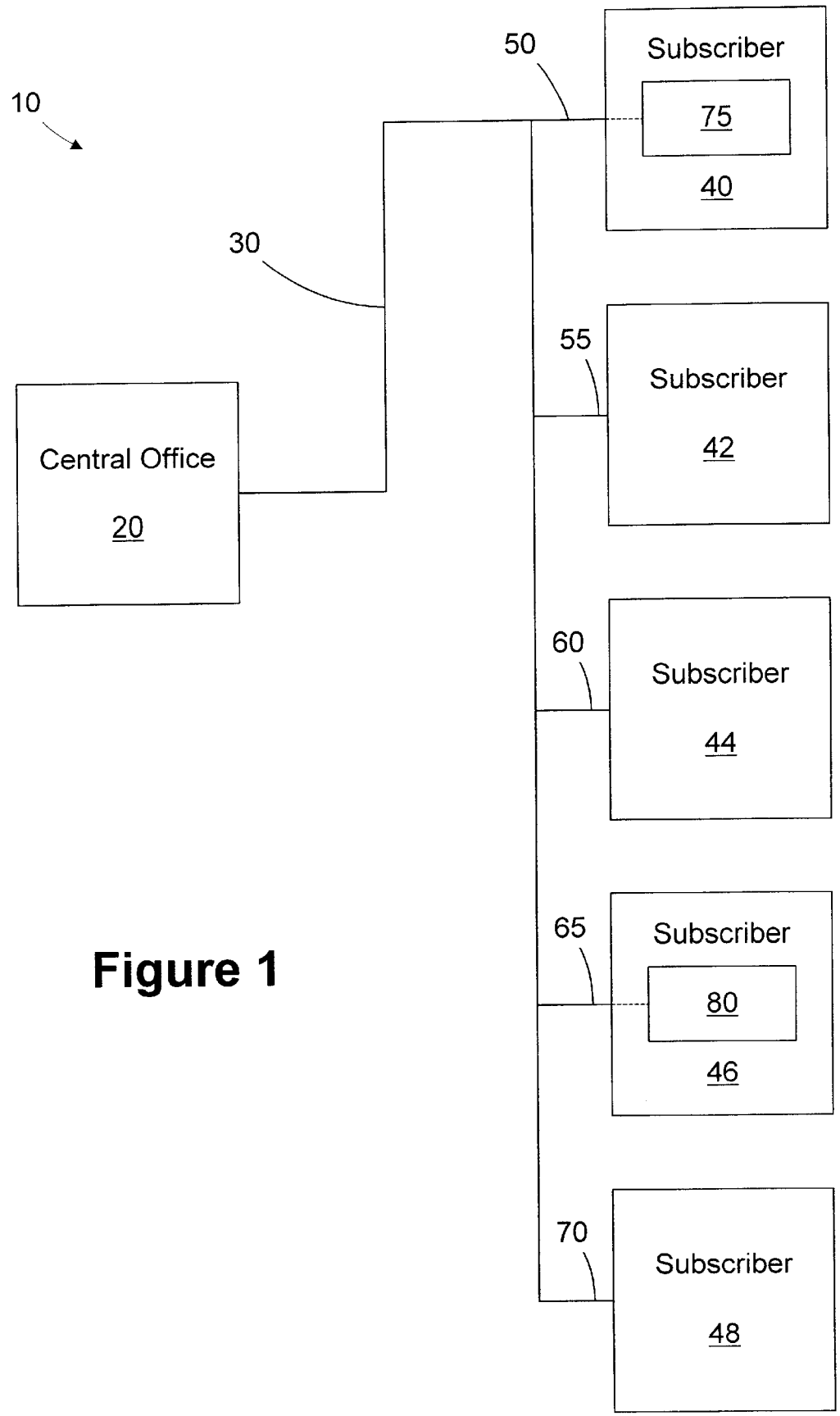
FIG. 1 is a simplified block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to.limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the Figures, and, particularly, to FIG. 1, a simplified block diagram of a communications system 10 in accordance with the present invention is provided. The communications system 10 includes a central office 20 coupled by a cable bundle 30 to a plurality of subscribers 40–48. The cable bundle 30 includes a plurality of subscriber lines 50–70, each connected to the subscribers 40–48, respectively. The subscriber 40 has a communications device 75 installed, and the subscriber 46 also has a communications device 80 installed. The communications devices 75, 80 may be any device, such as a modem or home network, coupled to the subscriber lines 50, 65.

Figure 2:
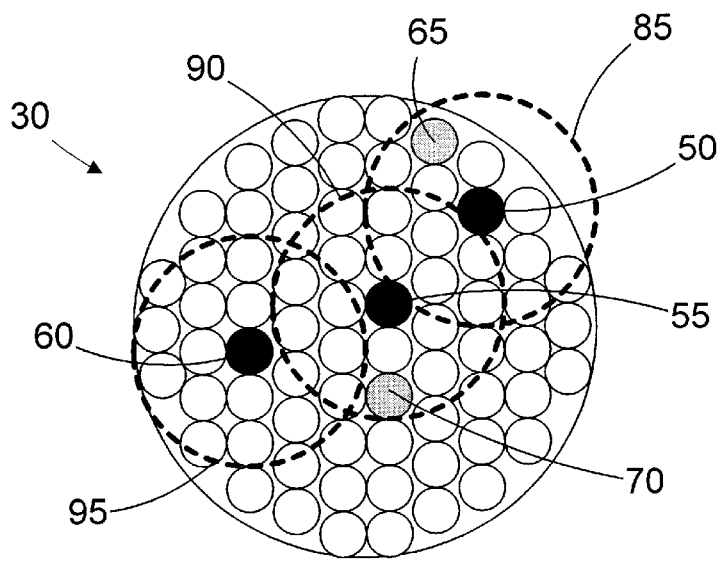
FIG. 2 is a cross-section view of a cable bundle having a plurality of subscriber lines.

Turning now to FIG. 2, a cross-section of the cable bundle 30 is shown. An interference zone 85 is associated with the subscriber line 50. For clarity, the subscriber line 50 is shown as a single conductor, however, in actuality, the subscriber line 50 is a two-conductor, twisted pair. Interference zones 90, 95 are also associated with the subscriber lines 55 and 60, respectively. The interference zone is defined as a zone encompassing adjacent lines into which a particular subscriber line may inject interference (i.e., cross-talk noise). Although only selected interference zones 85, 90, 95 are shown, it will be appreciated that each line has its own interference zone. Note that the interference zone 85 associated with the subscriber line 50 overlaps with the interference zone 90 associated with the subscriber line 55, but not with the interference zone 95 associated with the subscriber line 60. Also, the interference zone 85 extends outwardly beyond the cable bundle 30. The subscriber line 65 is within the interference zone 85 of the subscriber line 50, and thus, it is possible for the communications devices 75, 80 to interfere with one another. It will be appreciated that the particular subscriber lines contained within a particular interference zone may vary, depending on the location where the cross-section is taken, i.e., the interference zone 85 near the subscriber 50 may encompass different subscriber lines than those encompassed near the central office 20. The size and shape of the interference zone 85 may depend on factors such as the power level or frequency of the signal being transmitted on the subscriber line 50.

Figure 3:
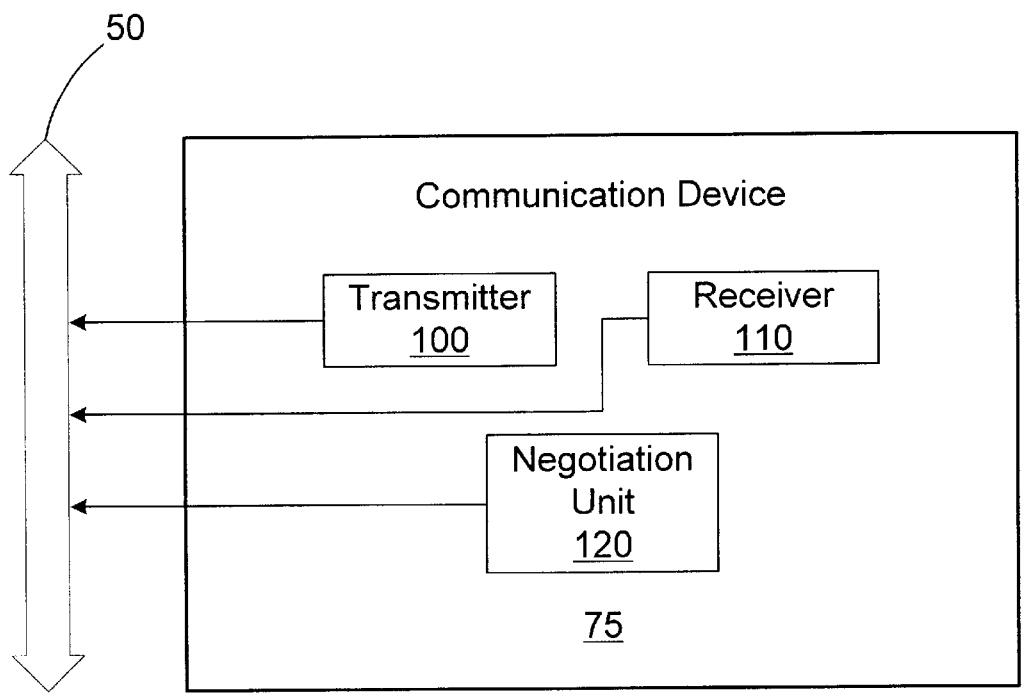
FIG. 3 is a simplified block diagram of a communications device in accordance with the present invention.

Referring now to FIG. 3, a simplified block diagram of the communications device 75 is provided. The communications device 75 may be any device coupled to the subscriber line 50 that uses the subscriber line 50 as a communication medium or can otherwise impose a signal on the subscriber line 50. The communications device 75 includes a transmitter 100 and a receiver 110 for communicating on the subscriber line 50. The construction details of the transmitter 100 and receiver 110 need not be delineated to promote understanding of the present invention. The requirements for conventional modems, such as ADSL modems, or home networks are defined by their respective industry specifications.

The communications device 75 includes a negotiation unit 120 adapted to communicate with other devices within the interference zone 85 of the communications device 75 so that negotiation between the devices might occur. As described in greater detail below, the negotiation may be passive, where the communications device 75 broadcasts a message to competing devices (not shown) requesting a certain bandwidth. Alternatively, the negotiation may be active, where the requirements of the communications device 75 and the competing devices (not shown) are exchanged and a solution is derived.

The negotiation unit 120 may use a number of methods for communicating with competing devices (not shown) within the interference zone 85. For purposes of illustration, one such technique is described herein. However, the application of the present invention is not limited to the particular signaling technique described. In the illustrated embodiment, the negotiation unit 120 broadcasts a high frequency signal (e.g., 10 MHz) including certain operating characteristics of the communications device 75. The signal power chosen for communication on the negotiation channel is selected such that the signal has a range consistent with the size of the expected interference zone 85 of the subscriber line 50. Thus, only those competing devices (not shown) having a propensity to interfere with the communications device 75 hear the message. As seen in FIG. 2, the interference zone 85 extends beyond the periphery of the cable bundle 30. It is possible, therefore, that a competing device may be present on a conductor outside the cable bundle 30, e.g., on an adjacent cable bundle or some other communication line). Although the negotiation unit 120 is described as a discrete entity, it is contemplated that its communications functions may be integrated into the transmitter 100 and/or the receiver 110, and that its processing functions may be performed by a dedicated processor (not shown) or an external processor (not shown), such as a computer (not shown) to which the communications device 75 is coupled.

The operating characteristics might include a relative loop length (e.g., long, short, medium) between the subscriber 40 and the central office 20. The operating characteristics might also include the frequency band desired by the communications device 75, or even the specific make and model of the communications device 75. It is also contemplated that the negotiation unit 120 may send out a proximity query to determine if any competing devices (not shown) are within the interference zone 85, after which devices that detect the proximity query may respond. An addressing scheme may be used to uniquely identify each device in the interference zone 85.

Within the illustrative context given by FIG. 1, the communications device 80 hears the proximity query initiated by the communications device 75 and responds accordingly. There are numerous actions that may be taken by either of the communications devices 75, 80. For example, if the subscriber line 50 is a short loop and the subscriber line 65 is long loop (i.e., and both devices 75, 80 are ADSL modems), the communications device 75 may elect to use the high tones and the communications device 80 may elect to use the low tones (i.e., an active exchange of characteristics). Thus, both devices 75, 80 may define their operating parameters to achieve their desired bandwidth goals. Alternatively, the communications device 80 may choose to retrain after being informed of the presence of the competing communications device 75. A technique for negotiating tone ranges in ADSL modems is described in U.S. patent application Ser. No. 09/106,995, entitled "Method and Apparatus for Scaling Modem Transfer Capacity" and incorporated herein by reference in its entirety.

If the communications device 75 is a modem and the communications device 80 is a home network, the communications device 75 may communicate over a desired frequency range, and the communications device 80 may elect to use a different frequency or reduce its signal power, thereby reducing interference in the particular range.

The communications device 75 may also broadcast a general request that all competing devices, such as the communications device 80, stay off their respective subscriber lines for a predetermined time interval (e.g., be quiet for 1 minute) so that a particular high priority data transfer might complete. Such a broadcast request may not require two-way communication between the communications device 75 and the communications device 80. Again, the types of exchanges described above might be active, where information is exchanged, or passive, where a request is made, and devices that can modify their operating parameters to comply with the request do so on their own volition.

Although there are various techniques that may be employed to coordinate communication between the communications device 75 and the communications device 80 (i.e., or other competing devices), a carrier sense/collision detect (CS/CD) scheme is described herein for exemplary purposes. Such a technique allows the devices 75, 80 to share the negotiation channel (i.e., the reserved 10 MHz channel). CS/CD mechanisms are well known to those of ordinary skill in the networking art, and thus are not described in complete detail to avoid unnecessarily obscuring the instant invention. Generally, a device always listens for traffic on the channel, even while transmitting. If no carrier is sensed, the device 75 may transmit its message on the channel. If a competing device (not shown) attempts to transmit on the channel at the same time, the communications device 75 increases its signal power so that the competing device might hear the carrier and detect the collision. The competing device (not shown) then backs off and waits a predetermined time interval (e.g., random or defined) before reinitiating its own transmission.

To further understanding of the present invention, an exemplary negotiation protocol is described. First, the communications device 75 enumerates and addresses the competing devices (not shown) in its interference zone 85 (e.g., by sending out a proximity query). A passive response to the query might be to modify the algorithms of the transmitter 100 or the receiver 110 to cope with the type of cross-talk to be expected. If the communications device 75 is an ADSL modem, it may For example, the communications device 75 may implement a maximum likelihood detection algorithm to remove home network cross-talk from its signals. Likewise, if the communications device 75 is a home network, it might implement similar algorithms to cancel ADSL cross-talk. Such a response is a passive response to the information learned from identifying the competing devices (not shown) in the interference zone 85.

After identifying the competing devices, the communications device 75 requests that the communications device 80 transmit a known signal and measures the strength of the signal. The communications device 75 compares the signal strength with that of other competing devices to determine the particular device causing the most cross-talk. The communications device 75 may also monitor the signatures (i.e., time domain signal after distortion and attenuation in the cable bundle 30) of the competing devices (not shown). Based on such information, the communications device 75 negotiates with the primary cross-talk providers to scale down their transmit power. It is possible that these devices had already been transmitting with a signal power higher than what was necessary to support their respective bandwidth or error rate goals.

A more global negotiation technique for optimizing the operation of the entire cable bundle 30 includes enumerating and addressing all devices (e.g., the communications devices 75, 80, and other competing devices) present in the cable bundle 30. The margins and loading patterns of the collective devices are analyzed and altered to optimize the performance of all of the devices. Those devices with excess margin lower their signal power or shift their signals to other frequency bands to assist those devices that have difficulty achieving their bandwidth goals.

Another negotiation technique involves the negotiation unit 120 sending a periodic identifier tag message over the negotiation channel, similar to the tag required by all radio broadcasting equipment. Such a periodic message facilitates may facilitate trouble shooting. Periodic tag transmission may also serve a means for providing a simplified technique for passively negotiating operating parameters. The negotiation unit 120 periodically sends an identification tag (e.g., including address, contact information, operating characteristics, etc.) specific to the communications device 75, and then listens to the other traffic in the interference zone 85. The negotiation unit 120 then maintains a current inventory of the competing devices (not shown) and may adjust the operating parameters of the communications device 75 accordingly without direct communication with a particular competing device, e.g., the communications device 80.

Figure 4:
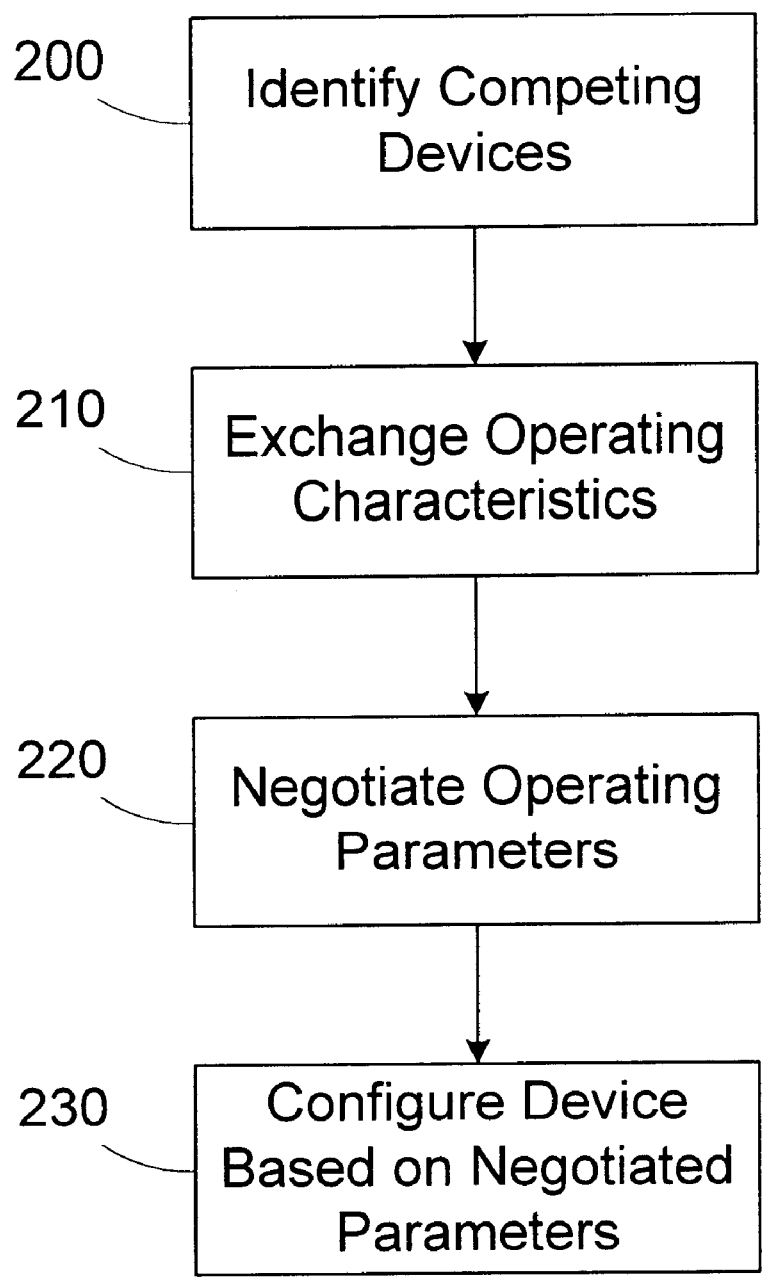
FIG. 4 is a flow diagram of a method for negotiating operating parameters between communications devices on distinct communications lines.

Turning now to FIG. 4, a flow diagram of a method for negotiating operating parameters between communications devices 75, 80 on distinct communications lines 50, 55 is provided. In block 200, competing devices are identified. For example, the competing devices may be identified by sending a proximity query followed by proximity responses, or by listening to periodic identification tags. Operating characteristics are exchanged in block 210. This exchange might be passive (e.g., characteristics are transmitted in identifier tag) or active (e.g., request predetermined signal and measure strength). Operating parameters (e.g., signal power, transmit frequency range, transmitter/receiver algorithms, etc.) are negotiated in block 220, and the device 75, 80 is configure based on the negotiated parameters in block 230.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:
   first and second subscriber lines;
   a first device having a first negotiation unit coupled to the first subscriber line; and
   a second device having a second negotiation unit coupled to the second subscriber line, wherein the first negotiation unit is adapted to send a first negotiation signal including an operating characteristic of the first device on the first subscriber line, the first negotiation signal induces through cross-talk a second negotiation signal on the second subscriber line, and the second negotiation unit is adapted to transmit a third negotiation signal including an operating characteristic of the second device on the second subscriber line in response to the second negotiation signal, the third negotiation signal inducing through cross-talk a fourth negotiation signal on the first subscriber line, and modify an operating parameter of the second device based on the second negotiation signal.

2. The communications system of claim 1, further comprising a central office coupled to the first subscriber line, and wherein the operating characteristic includes a loop length characteristic based on the length of the first subscriber line from the central office to the first device.

3. The communications system of claim 1, wherein the operating characteristic includes a desired frequency range.

4. The communications system of claim 1, wherein the second device includes a transmitter, and the operating characteristic includes the transmit power of the transmitter.

5. The communications system of claim 1, wherein the second device includes a transmitter, and the operating characteristic includes the transmit frequency of the transmitter.

6. The communications system of claim 1, wherein the second device includes a transmitter and a receiver, and the operating characteristic includes the enabling of a processing algorithm associated with one of the transmitter and the receiver.

7. The communications system of claim 1, wherein the first negotiation unit is adapted to compare the operating characteristic of first device to the operating characteristic of the second device and modify an operating parameter of the first device based on the comparison.

8. The communications system of claim 1, wherein the first and second subscriber lines are contained in a cable bundle.

9. The communications system of claim 1, wherein one of the first and second subscriber lines is contained in a cable bundle, and the other of the first and second subscriber lines is external to the cable bundle.

10. The communications system of claim 9, wherein the second device includes a transmitter and a receiver and the second negotiation unit is adapted to retrain at least one of the transmitter and the receiver based on the second negotiation signal.

11. A communications system, comprising:
    first and second subscriber lines;
    a first device having a first negotiation unit coupled to the first subscriber line, the first device having a first set of operating characteristics; and
    a second device having a second negotiation unit coupled to the second subscriber line, the second device having a second set of operating characteristics wherein the first and second negotiation units are adapted to communicate through a cross-talk signal between the first and second subscriber lines to exchange the first and second sets of operating characteristics.

12. The communications system of claim 11, wherein the first negotiation unit is adapted to modify an operating parameter of the first device based on the second set of operating characteristics.

13. The communications system of claim 12, wherein the second negotiation unit is adapted to modify an operating parameter of the second device based on the first set of operating characteristics.

14. The communications system of claim 11, further comprising a central office coupled to the first subscriber line, and wherein the first set of operating characteristics includes a loop length characteristic based on the length of the first subscriber line from the central office to the first device.

15. The communications system of claim 11, wherein the first set of operating characteristics includes a desired frequency range.

16. The communications system of claim 12, wherein the first device includes a transmitter, and the operating parameter includes the transmit power of the transmitter.

17. The communications system of claim 12, wherein the first device includes a transmitter, and the operating parameter includes the transmit frequency of the transmitter.

18. The communications system of claim 12, wherein the first device includes a transmitter and a receiver, and the operating parameter includes the enabling of a processing algorithm associated with one of the transmitter and the receiver.

19. The communications system of claim 11, wherein the first and second subscriber lines are contained in a cable bundle.

20. The communications system of claim 11, wherein one of the first and second subscriber lines is contained in a cable bundle, and the other of the first and second subscriber lines is external to the cable bundle.

21. The communications system of claim 11, wherein the second device includes a transmitter and a receiver and the second negotiation unit is adapted to retrain at least one of the transmitter and the receiver based on the cross-talk signal.

22. A method for negotiating operating parameters in a communications system, comprising:

transmitting from a first device coupled to a first subscriber line a first negotiation signal including an operating characteristic of the first device;

receiving the first negotiation signal through cross-talk in a second device coupled to a second subscriber line independent of the first subscriber line;

transmitting from the second device a second negotiation signal including an operating characteristic of the second device on the second subscriber line in response to the first negotiation signal;

receiving the second negotiation signal through cross-talk in the first device; and modifying an operating parameter of the second device based on the first negotiation signal.

23. The method of claim 22, wherein transmitting the operating characteristic includes transmitting a loop length characteristic based on the length of the first subscriber line from a central office to the first device.

24. The method of claim 22, wherein transmitting the operating characteristic includes transmitting a desired frequency range.

25. The method of claim 22, wherein the second device includes a transmitter and modifying the operating parameter includes modifying the transmit power of the transmitter.

26. The method of claim 22, wherein the second device includes a transmitter and modifying the operating parameter includes modifying the transmit frequency of the transmitter.

27. The method of claim 22, wherein the second device includes a transmitter and a receiver, and modifying the operating parameter includes modifying includes enabling a processing algorithm associated with one of the transmitter and the receiver.

28. The method of claim 22, further comprising:

comparing the operating characteristic of first device to the operating characteristic of the second device; and modifying an operating parameter of the first device based on the comparison.

29. The method of 22, wherein the second device includes a transmitter and a receiver and the modifying the operating parameter of the second device based on the first negotiation signal includes retraining at least one of the transmitter and the receiver.

* * * * *